United States Patent
Pichon et al.

(10) Patent No.: US 7,663,822 B2
(45) Date of Patent: Feb. 16, 2010

(54) ACTUATING DEVICE COMPRISING BIMETAL DISKS

(75) Inventors: Guillaume Pichon, Paris (FR); Alain Martinez, Bessancourt (FR)

(73) Assignee: Sagem Defense Securite, Paris (FR)

( * ) Notice: Subject to any disclaimer, the term of this patent is extended or adjusted under 35 U.S.C. 154(b) by 0 days.

(21) Appl. No.: 11/815,830

(22) PCT Filed: Feb. 9, 2006

(86) PCT No.: PCT/FR2006/000300

§ 371 (c)(1),
(2), (4) Date: Jan. 3, 2008

(87) PCT Pub. No.: WO2006/085002

PCT Pub. Date: Aug. 17, 2006

(65) Prior Publication Data

US 2008/0253001 A1    Oct. 16, 2008

(30) Foreign Application Priority Data

Feb. 14, 2005 (FR) .................................. 05 01474

(51) Int. Cl.
*G02B 7/02* (2006.01)
(52) U.S. Cl. ....................................... 359/820; 359/824

(58) Field of Classification Search ......... 359/694–701, 359/819–824
See application file for complete search history.

(56) References Cited

U.S. PATENT DOCUMENTS

| 3,503,004 | A | | 3/1970 | Haisma et al. ................. 372/20 |
| 4,236,790 | A | * | 12/1980 | Smith .......................... 359/820 |
| 4,861,137 | A | * | 8/1989 | Nagata ........................ 359/820 |
| 5,283,695 | A | * | 2/1994 | Ziph-Schatzberg et al. .. 359/820 |
| 6,292,312 | B1 | * | 9/2001 | Broome ....................... 359/820 |
| 6,650,412 | B1 | | 11/2003 | Slater ........................... 356/328 |

OTHER PUBLICATIONS

International Search Report for corresponding PCT Application No. PCT/FR2006/000300 report dated May 18, 2006.
Written Opinion of the International Searching Authority PCT/FR2006/000300; issued Sep. 3, 2007.

* cited by examiner

*Primary Examiner*—Mohammed Hasan
(74) *Attorney, Agent, or Firm*—Miller, Matthias & Hull

(57) ABSTRACT

The invention relates to an actuating device comprising at least two coaxial bimetal disks and at least one axial strut arranged between the disks, the bimetal disks being mounted opposite each other and being deformable in opposite directions according to the thermal variations. The invention can be especially applied to the thermal compensation of an optical system.

22 Claims, 4 Drawing Sheets

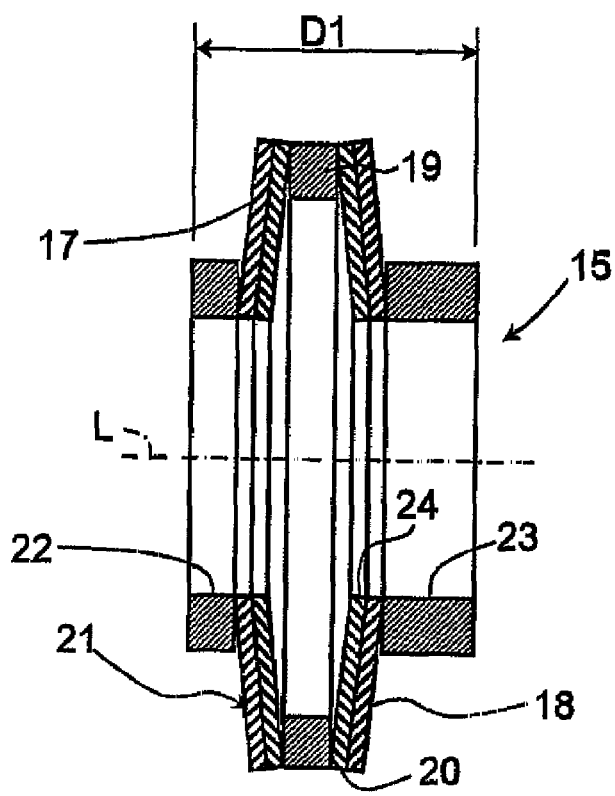
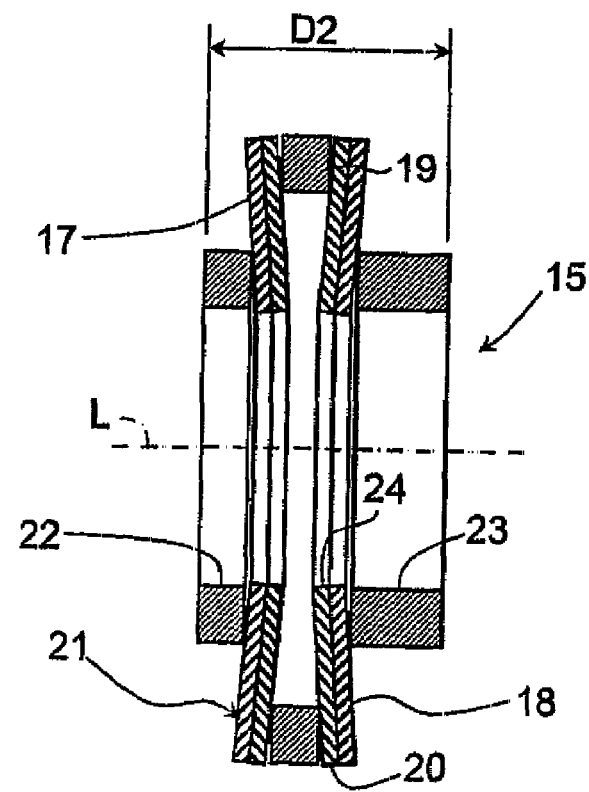

ACTUATING DEVICE COMPRISING BIMETAL DISKS

CROSS REFERENCE TO RELATED APPLICATION

This is the U.S. National Phase of International Application No. PCT/FR2006/000300 filed 9 Feb. 2006, which claims priority to French Patent Application No. FR 05 01474 filed on 14 Feb. 2005, the entire disclosures of which are incorporated herein by reference.

FIELD OF THE DISCLOSURE

The invention relates to a thermal actuation device.

BACKGROUND OF THE DISCLOSURE

The problems with which the inventors were confronted were in the optics field, although the invention is not limited to this field of application.

Certain optical systems are intended to operate over a wide temperature range (for example from about −60° C. to about +100° C.). In these systems, it appears to be necessary to compensate for the displacements, contractions and/or expansions of the focusing optics and also for their index variations, even though minute, due to the thermal variations so as to maintain performance constancy of the system.

To give an example, we mention optical systems intended for infrared imaging, in which certain materials chosen for the focusing optics (generally germanium) prove to be quite sensitive to thermal variations.

It is known to compensate for the displacements, expansions or contractions of the focusing optics by means of active systems (comprising motors controlled by a computing unit with feedback) or passive systems (for example comprising bimetal systems, as proposed in U.S. Pat. No. 4,861,137 or else systems employing materials having a high expansion coefficient, as proposed in U.S. Pat. No. 6,292,312)

Active systems have the major drawback of requiring a current supply and the installation of a feedback loop allowing a computing unit to correct, by means of the motors, the dimensional or positional variations to which the focusing optics are subjected.

As regards the systems of the type proposed in document U.S. Pat. No. 4,861,137, these have the drawback of being limited in terms of deflection. Furthermore, in the particular case of the mounting device described in the aforementioned document, the problem of maintaining parallelism between the axis of the focusing optic, the compensation device for which provides the displacement, and the optical axis of the system in its entirety may arise. Passive systems, more particularly those employing materials having a high expansion coefficient, have the drawback of having a narrow linear deformation range relative to the required use range.

SUMMARY OF THE DISCLOSURE

The present invention proposes a passive thermal actuation device, that is to say one requiring no external energy supply, said device being capable of greater displacement.

For this purpose, the invention provides a thermal actuation device comprising:

at least two coaxial bimetal disks; and at least one axial keeper interposed between the disks, which is characterized in that said bimetal disks are mounted in opposition one with respect to the other and are capable of deforming in opposite directions depending on the thermal variations.

Such a device is capable of deforming, depending on the thermal variations, between:

a first configuration, called convex configuration, in which the disks are domed away from each other, the device adopting in cross section an O-shape open to a greater or lesser extent according to the magnitude of the thermal variation; and a second configuration, called concave configuration, in which the disks are dished toward each other, the device adopting in cross section an X-shape flattened to a greater or lesser extent according to the magnitude of the thermal variation.

According to a first way of mounting the disks, the device tends to become convex when the temperature increases, and concave when on the contrary the temperature decreases. According to a second way of mounting them, this behavior is reversed.

Consequently, the displacements due to the deformations of each of the bimetal disks are added. This results in a greater amplitude of the displacements permitted by this device compared with the known devices, and also a more extensive linear deformation range According to one embodiment, the keeper is placed neat peripheral edges of the disks.

The keeper for example takes the form of a cylindrical bush, coaxial with the bimetal disks.

The device may furthermore include at least a second keeper adjacent one of the bimetal disks, said second keeper being located on the opposite side of the latter to the keeper located between the bimetal disks and radially offset relative to this keeper.

According to a preferred embodiment, the device includes two external keepers placed on either side of the bimetal disks and offset radially with respect to the keeper located between the bimetal disks.

According to another aspect, the invention provides a system comprising:

a frame;

a part mounted so as to move translationally with respect to the frame; and a bimetal thermal actuation device as described above, interposed between the frame and the moving part, suitable for displacing said moving part relative to the frame according to the thermal variations.

According to one embodiment, the optical system includes two thermal actuation devices placed on either side of the part. As a variant, a return spring, coupled to the thermal actuation device, is interposed between the frame and the part.

According to yet another aspect, the invention provides an optical system comprising:

a frame;

a support mounted so as to move translationally with respect to the frame, and on which at least one lens is mounted; and a bimetal thermal actuation device as described above, interposed between the frame and the support, suitable for displacing said support relative to the frame according to the thermal variations.

According to one embodiment, the optical system includes two thermal actuation devices placed on either side of the support. As a variant, a return spring, coupled to the thermal actuation device, is interposed between the frame and the support.

BRIEF DESCRIPTION OF THE DRAWINGS

Other objects and advantages of the invention will become apparent in the light of the description given below, with reference to the appended drawings in which:

FIGS. 5 and 6 are views similar to FIG. 4, showing the thermal actuation device of FIG. 4 in a convex position and in a concave position, respectively;

DETAILED DESCRIPTION OF THE DISCLOSURE

Figure 1:
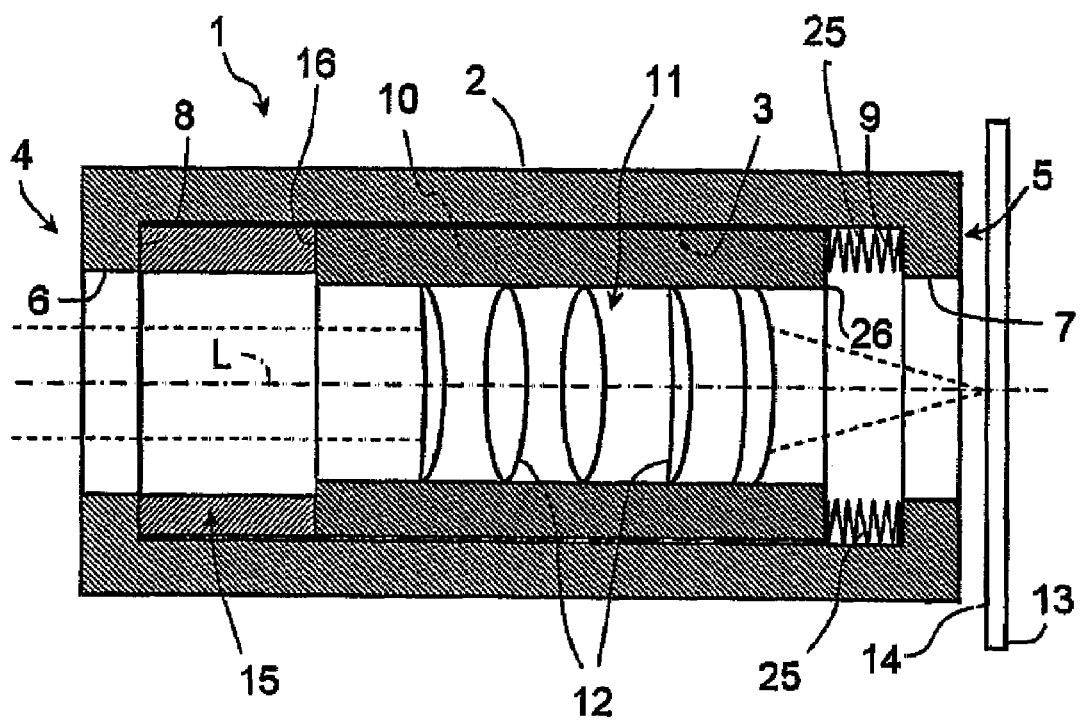
FIG. 1 is a sectional view illustrating an optical system equipped with a thermal actuation device according to the invention.

FIG. 1 shows an optical system 1 comprising a frame 2 in which a bore 3 extending along a longitudinal axis L is made, said bore opening to the outside, at two ends 4, 5 of the frame 2, by two openings 6, 7 produced in the form of counterbores defining shoulders 8, 9.

A support 10, hereafter called a barrel, is mounted in the frame 2 coaxially with the bore 3, being mounted so as to move translationally in relation to the frame 2. As may be seen in FIGS. 1 and 2, the barrel 10 is in the form of a hollow cylinder placed between the ends 4, 5 at a certain distance from the shoulders 8 and 9.

A focusing optic 11 comprising at least one lens 12 (in this case a succession of lenses) is mounted in the barrel 10, the focal axis of the optic 11 being substantially coincident with the longitudinal axis L Placed at one end 5 of the frame 2 is a screen 13, one face 14 of which, turned toward the frame 2, constitutes a focal plane for a light signal coming from the opposite end 4 and passing through the focusing optic 11.

To compensate for the deformations and the index variations undergone by the lenses 12 under the effect of the thermal variations to which they are subjected, which variations would in the absence of correction lead to a focusing defect of the light signal, the system 1 further includes a bimetal thermal actuation device 15 interposed between the frame 2 and the barrel 10 (more precisely between one of the shoulders 8 and an end face 16 of the barrel 10), which device moves the barrel relative to the frame 2 according to the thermal variations.

The thermal actuation device 15 is shown schematically in FIG. 1 in the form of a block. Its detailed structure is shown in FIG. 3.

Figure 3:
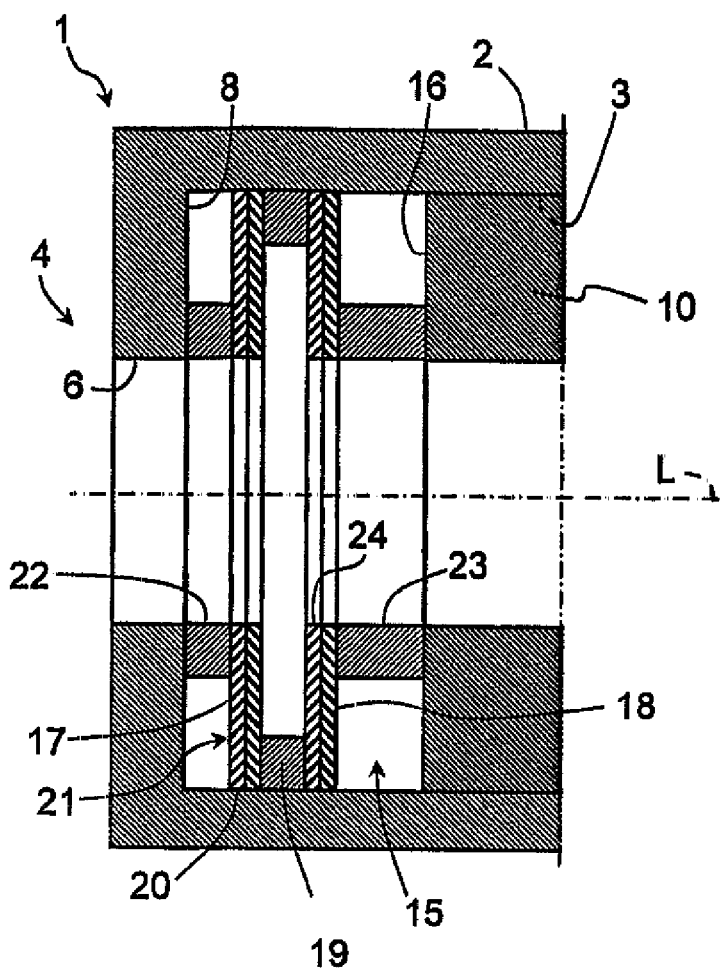
FIG. 3 is a detailed sectional view of the system of FIG. 1.

As may be seen in FIG. 3, the thermal actuation device 15 comprises two coaxial bimetal disks 17, 18, the axes of which are substantially coincident with the longitudinal axis L and, between said disks, a keeper 19 in the form of a hollow cylindrical bush is interposed, this being placed near peripheral edges 20 of the disks 17, 18 coaxially with respect to the latter.

Each bimetal disk 17, 18 is of a known type and commercially available.

Starting from a plane configuration, this type of disk becomes domed (more precisely, it deforms into a truncated cone) according to the temperature changes.

The deflection A of each disk 17, 18, defined as the displacement undergone by a lateral face 21 of the disk 17 or 18, is given by the following formula:

$$A = \frac{a(d2^2 - d1^2)}{45s} \Delta T$$

where:
 a is the specific deflection of the disk, expressed in $K^{-1}$;
 d2 is the outside diameter of the disk;
 d1 is the inside diameter of the disk;
 s is the thickness of the disk; and
 $\Delta T$ is the temperature change The disks 17, 18 may be chosen to be strictly identical Furthermore, as may be seen in FIGS. 5 and 6, they are mounted in opposition one with respect to the other, that is to say that the same temperature change makes them deform in opposite directions.

Figure 4:
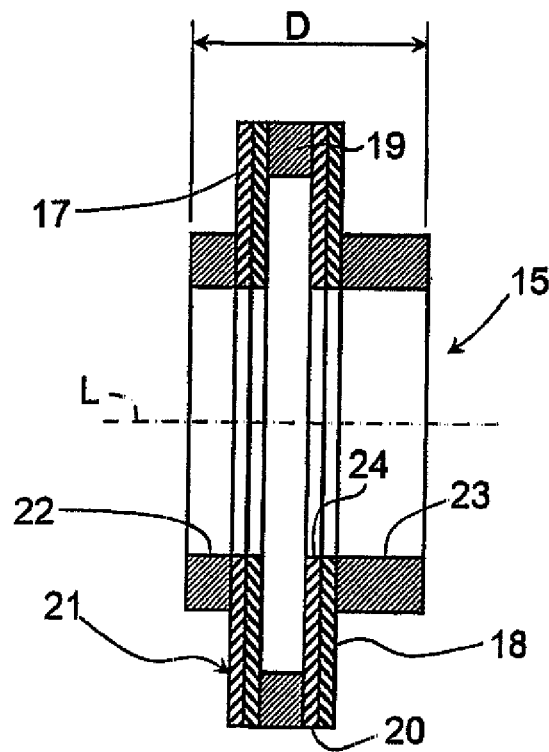
FIG. 4 is a sectional view illustrating a thermal actuation device according to the invention, in a median position.
Figure 7:
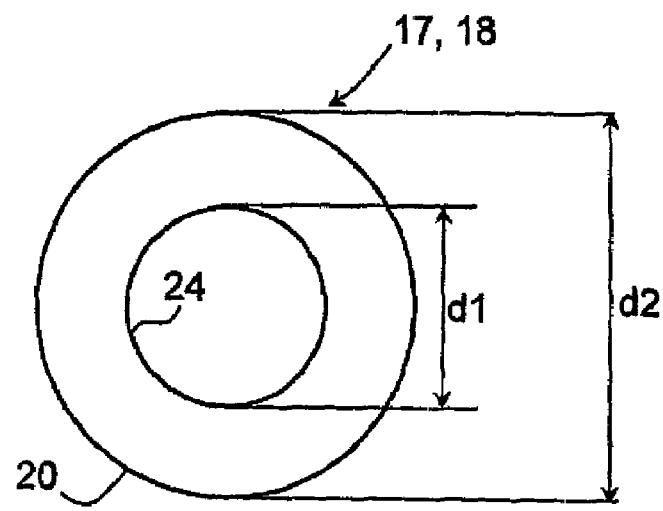
FIG. 7 is a plan view showing a bimetal disk.
Figure 8:
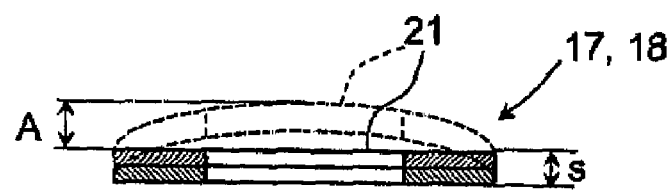
FIG. 8 is a sectional view of the bimetal disk of FIG. 7, shown underformed by the solid lines and deformed by the broken lines.

In addition, as shown in FIGS. 4 to 6, the device 15 includes, in addition to the keeper 19 (called the internal keeper) interposed between the disks 17, 18, a first external keeper 22 located on the opposite side of one of the disks 17 to the internal keeper 19, and also a second external keeper 23 located on the opposite side of the other disk 18 to the internal keeper 19.

The keepers 22, 23 take the form of hollow cylindrical bushes coaxial with the disks 17, 18, and are placed near an internal edge 24 of the latter, that is to say the keepers 22, 23 are radially offset with respect to the internal keeper 19.

In the optical system 1, the first external keeper 22 is interposed between the shoulder 8 and the disk 17, while the second external keeper 23 is interposed between the other disk 18 and the end face 16 of the barrel 10, as shown in FIG. 4.

It is therefore via the external keepers 22, 23 that the disks 17, 18 bear, on one side, on the shoulder 8 and, on the other side, on the barrel 10.

Thus, the device 1 is capable of deforming, depending on the thermal variations, between:
 a first configuration, called convex configuration, illustrated in FIG. 5, in which the disks 17, 18 are domed away from each other, the device 15 adopting in cross section an O shape open to a greater or lesser extent according to the magnitude of the thermal variation; and
 a second configuration, called concave configuration, illustrated in FIG. 6, in which the disks 17, 18 are dished toward each other, the device adopting in cross section an X shape flattened to a greater or lesser extent according to the magnitude of the thermal variation The direction of deformation of the disks 17, 18 depends on the way they are mounted. Thus, according to a first embodiment, the disks 17, 18 are mounted in such a way that the convexity of the device 15 increases when the temperature increases ($\Delta T > 0$) and decreases (that is to say its concavity increases) when on the contrary the temperature decreases ($\Delta T < 0$) According to a second embodiment, in which the way the disks are mounted is the opposite to the first embodiment, the effects produced by the temperature changes are reversed.

In the example illustrated, the way the device is mounted is in accordance with the first embodiment. In the convex configuration of the device 15, obtained after a positive temperature change (ΔT>0), the axial dimension D1 of the device 15 is equal to its dimension D in the undeformed state (that is to say its axial dimension when the disks are plane, cf. FIG. 4) increased by twice the deflection A as defined above, insofar as the respective deflections of the disks 17, 18 combine together. The displacement of the barrel 10 toward the focal plane 14, against a restoring force exerted by one or more springs 25 working in compression and interposed between the shoulder 9 and an end face 26 of the barrel 10, on the opposite side from the face 16, is equal to the difference D1–D.

In the concave configuration of the device 15, obtained after a negative temperature change (ΔT<0), the axial dimension D2 of the device 15 is equal to its dimension D in the undeformed state decreased by twice the deflection A as defined above, in so far as the respective deflections of the disks 17, 18 combine in the opposite direction to the convex configuration. The displacement of the barrel 10, in the opposite direction to that defined above under the effect of the expansion of the springs 25, is equal to the difference D–D2.

By combining the deflections of the bimetal disks 17, 18 it is possible, compared with the known devices, to obtain a greater amplitude in the displacements undergone by the barrel 10 by the thrust of the actuation device 15.

In addition, owing to the linearity of the deflection of the disks 17, 18 over an extended temperature range (at least between −60° C. and +100° C., this upper bound possibly reaching 200° C.), it is possible to know in advance the precise displacement undergone by the barrel 10 as a function of the temperature, thus adapting this displacement so as to compensate for the deformations and index variations under gone by the optical system 1.

More precisely, it is possible to modify the displacement law of the barrel 10 by varying the parameters a, d1, d2 and s (that is to say by choosing, depending on the specifications of the lenses 12 allowing them to deform according to the temperature changes, the dimensions and the materials of the disks 17, 18).

It may be envisioned, while keeping the functions described above, to reverse the respective radial locations of the internal keeper 19, which will thus be placed near the inner edges 24 of the disks 17, 18, and of the external keepers 22, 23, which will then be placed near the peripheral edges 20 of the disks 17, 18.

The operation of the device 15 is then reversed, the displacement of the barrel 10 being positive (i.e. toward the focal plane 14) in the concave configuration, and negative (in the opposite direction) in the convex configuration.

Figure 2:
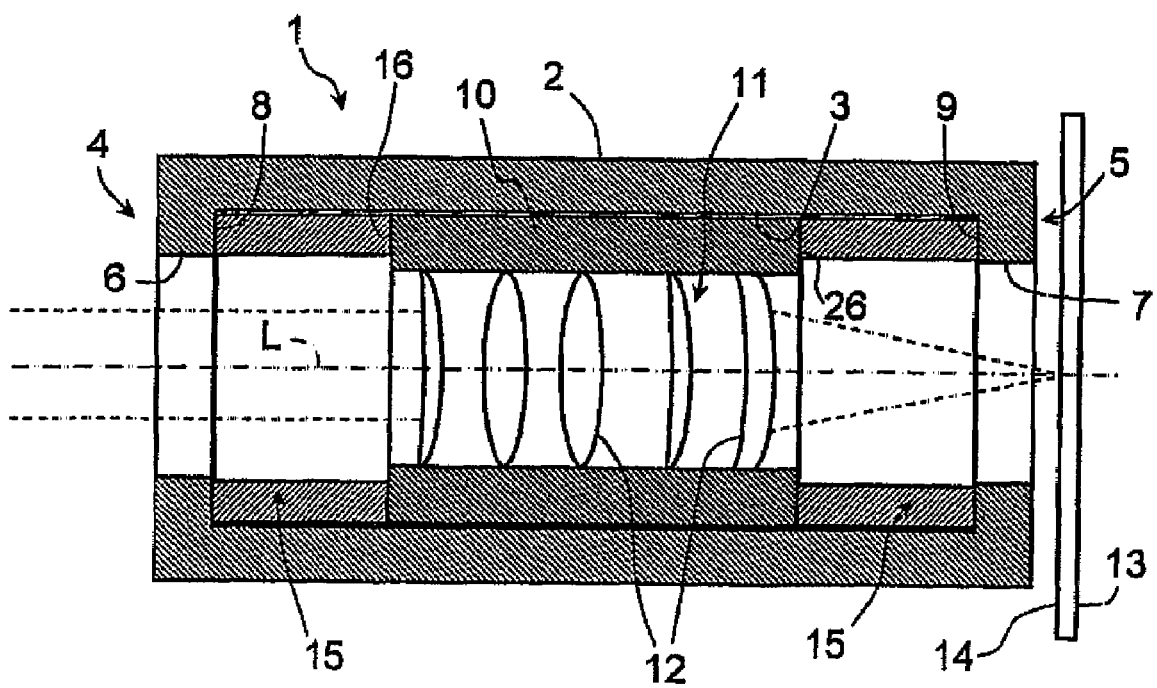
FIG. 2 is a sectional view similar to FIG. 1, illustrating an optical system equipped with two thermal actuation devices according to the invention, operating in parallel.

It may also be envisioned to couple several actuation devices 15, either by mounting them adjacent to the others so as to combine their displacements, or to place them on either side of the barrel 10, as shown in FIG. 2, in which the return spring 25 is replaced with a second actuation device 15, the operation of which is the reverse of that of the first, so as to provide a conjoint bilateral displacement of the barrel 10.

Figure 9:
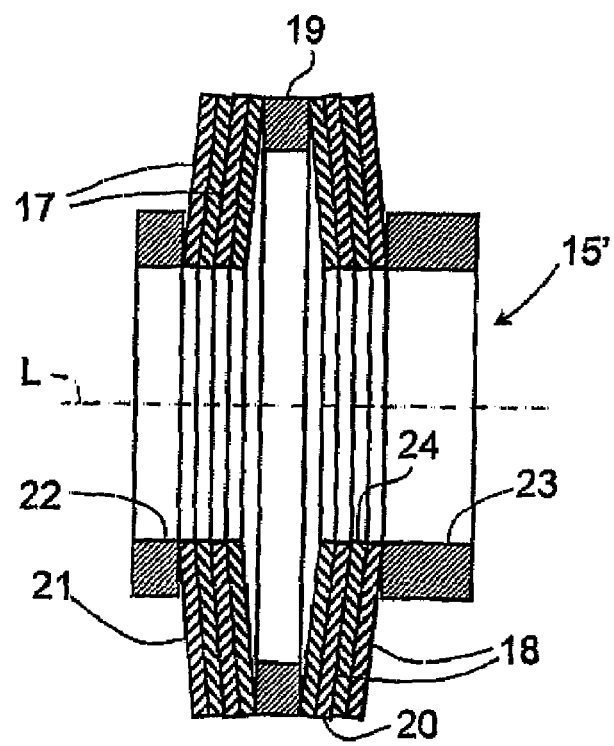
FIG. 9 is a view similar to FIG. 5, according to an alternative embodiment.

Moreover, according to an alternative embodiment, illustrated in FIG. 9, it is possible to form, on either side of the keeper 19, stacks of disks oriented in the same direction, so as to increase the mechanical stiffness of the device 1 and thus adapt it to the resistance opposed by the support 10. In the example shown in FIG. 9, two opposed pairs of disks 17, 18 are placed on each side of the keeper 19, the device 15' obtained having the same deflection as the simple device 15 described above, but with twice the mechanical stiffness.

As mentioned in the introduction, the invention is not limited to the field of optics, given by way of illustrative example in the foregoing description.

A bimetal thermal actuation device as described above may in fact be used in any mechanical system requiring a predetermined and controlled displacement of a part that can move according to the temperature changes

What is claimed is:

1. A thermal actuation device comprising:
   at least two coaxial bimetal disks; and
   at least one axial keeper interposed between the disks, wherein said bimetal disks are mounted in opposition one with respect to the other and are capable of deforming in opposite directions depending on the thermal variations, toward:
      a first configuration, called convex configuration, in which the disks are domed away from each other when the temperature change is positive; and
      a second configuration, called concave configuration, in which the disks are dished toward each other when the temperature change is negative.

2. The thermal actuation device as claimed in claim 1, in which the keeper is placed near peripheral edges of the disks.

3. The thermal actuation device as claimed in claim 2, in which the keeper takes the form of a cylindrical bush coaxial with the bimetal disks.

4. The thermal actuation device as claimed in claim 2, which includes at least a second keeper adjacent one of the bimetal disks, said second keeper being located on the opposite side of the latter to the keeper located between the bimetal disks and radially offset relative to this keeper.

5. The thermal actuation device as claimed in claim 4, which comprises two external keepers placed on either side of the bimetal disks and offset radially with respect to the keeper located between the bimetal disks.

6. A system comprising:
   a frame;
   a part mounted so as to move translationally with respect to the frame; and
   a bimetal thermal actuation device as claimed in claim 1, interposed between the frame and the moving part, suitable for displacing said moving part relative to the frame according to the thermal variations.

7. The system as claimed in claim 6, which includes a return spring interposed between the frame and the moving part and coupled to the thermal actuation device.

8. The system as claimed in claim 6, which includes two thermal actuation devices placed on either side of the moving part.

9. An optical system comprising:
   a frame;
   a support mounted so as to move translationally with respect to the frame, and on which at least one lens is mounted; and
   a bimetal thermal actuation device as claimed in claim 1, interposed between the frame and the support, suitable for displacing said support relative to the frame according to the thermal variations.

10. The optical system as claimed in claim 9, which includes a return spring interposed between the frame and the support and coupled to the thermal actuation device.

11. The optical system as claimed in claim 9, which includes two thermal actuation devices placed on either side of the support.

12. A thermal actuation device comprising:

at least two coaxial bimetal disks; and at least one axial keeper interposed between the disks, wherein said bimetal disks are mounted in opposition one with respect to the other and are capable of deforming in opposite directions depending on the thermal variations, toward:

a first configuration, called convex configuration, in which the disks are domed away from each other when the temperature change is negative; and a second configuration, called concave configuration, in which the disks are dished toward each other when the temperature change is positive.

13. The thermal actuation device as claimed in claim 12, in which the keeper is placed near peripheral edges of the disks.

14. The thermal actuation device as claimed in claim 13, in which the keeper takes the form of a cylindrical bush coaxial with the bimetal disks.

15. The thermal actuation device as claimed in claim 13, which includes at least a second keeper adjacent one of the bimetal disks, said second keeper being located on the opposite side of the latter to the keeper located between the bimetal disks and radially offset relative to this keeper.

16. The thermal actuation device as claimed in claim 15, which comprises two external keepers placed on either side of the bimetal disks and offset radially with respect to the keeper located between the bimetal disks.

17. A system comprising:

a frame;

a part mounted so as to move translationally with respect to the frame; and a bimetal thermal actuation device as claimed in claim 12, interposed between the frame and the moving part, suitable for displacing said moving part relative to the frame according to the thermal variations.

18. The system as claimed in claim 17, which includes a return spring interposed between the frame and the moving part and coupled to the thermal actuation device.

19. The system as claimed in claim 17, which includes two thermal actuation devices placed on either side of the moving part.

20. An optical system comprising:

a frame;

a support mounted so as to move translationally with respect to the frame, and on which at least one lens is mounted; and a bimetal thermal actuation device as claimed in claim 12, interposed between the frame and the support, suitable for displacing said support relative to the frame according to the thermal variations.

21. The optical system as claimed in claim 20, which includes a return spring interposed between the frame and the support and coupled to the thermal actuation device.

22. The optical system as claimed in claim 20, which includes two thermal actuation devices placed on either side of the support.

\* \* \* \* \*